(12) United States Patent
Jump et al.

(10) Patent No.: US 8,065,044 B2
(45) Date of Patent: Nov. 22, 2011

(54) VEHICLE GUIDANCE SYSTEM

(75) Inventors: Michael Jump, Liverpool (GB); Gareth D. Padfield, Liverpool (GB); David N. Lee, Edinburgh (GB)

(73) Assignee: The University of Liverpool, Liverpool (GB)

( * ) Notice: Subject to any disclaimer, the term of this patent is extended or adjusted under 35 U.S.C. 154(b) by 1293 days.

(21) Appl. No.: 11/461,277

(22) Filed: Jul. 31, 2006

(65) Prior Publication Data

US 2008/0027594 A1 Jan. 31, 2008

(51) Int. Cl.
*G06F 17/00* (2006.01)
(52) U.S. Cl. ......... 701/11; 701/1; 701/3; 701/4; 701/16; 701/96; 244/75.1; 244/76 R; 244/180; 244/181
(58) Field of Classification Search .................. 701/11, 701/1, 3, 4, 200
See application file for complete search history.

(56) References Cited

U.S. PATENT DOCUMENTS

| | | | | |
|---|---|---|---|---|
| 4,368,517 A * | 1/1983 | Lovering | | 701/16 |
| 4,419,079 A * | 12/1983 | Georges et al. | | 434/43 |
| 4,626,851 A * | 12/1986 | Tooze | | 340/975 |
| 5,361,212 A * | 11/1994 | Class et al. | | 701/16 |
| 5,529,138 A * | 6/1996 | Shaw et al. | | 180/169 |
| 5,559,695 A * | 9/1996 | Daily | | 701/1 |
| 5,922,039 A * | 7/1999 | Welch et al. | | 701/116 |
| 6,173,220 B1 * | 1/2001 | Schmitt | | 701/4 |
| 6,239,725 B1 * | 5/2001 | Bray | | 340/953 |
| 6,269,307 B1 * | 7/2001 | Shinmura et al. | | 701/301 |
| 6,311,108 B1 * | 10/2001 | Ammar et al. | | 701/16 |
| 6,470,257 B1 * | 10/2002 | Seto | | 701/96 |
| 6,591,171 B1 * | 7/2003 | Ammar et al. | | 701/16 |
| 6,832,157 B2 * | 12/2004 | Egami | | 701/301 |
| 7,113,867 B1 * | 9/2006 | Stein | | 701/301 |
| 7,499,773 B2 * | 3/2009 | Pire et al. | | 701/3 |
| 2002/0091479 A1 * | 7/2002 | Maruko et al. | | 701/96 |
| 2002/0152015 A1 * | 10/2002 | Seto | | 701/96 |
| 2003/0132860 A1 * | 7/2003 | Feyereisen et al. | | 340/973 |
| 2003/0236602 A1 * | 12/2003 | Kuge et al. | | 701/36 |
| 2004/0090320 A1 * | 5/2004 | Suzuki et al. | | 340/435 |
| 2004/0143393 A1 * | 7/2004 | Knecht et al. | | 701/301 |
| 2005/0278098 A1 * | 12/2005 | Breed | | 701/45 |
| 2008/0046145 A1 * | 2/2008 | Weaver et al. | | 701/41 |
| 2009/0207048 A1 * | 8/2009 | He et al. | | 340/973 |

* cited by examiner

*Primary Examiner* — Khoi Tran
*Assistant Examiner* — Jonathan Sample
(74) *Attorney, Agent, or Firm* — Mark E. Scott; Conley Rose, P.C.

(57) ABSTRACT

A vehicle guidance system comprising: a measurement system; a processor arranged to receive information from the measurement system and convert said information into at least one time-to-contact based parameter; and a control system arranged to receive the at least one time-to-contact based parameter from the processor and use the at least one time-to-contact based parameter to either automatically guide the vehicle or to provide vehicle guidance information to a pilot.

33 Claims, 8 Drawing Sheets

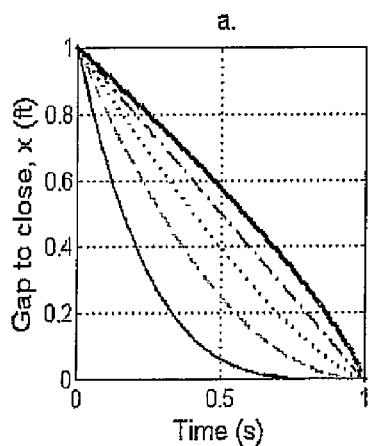
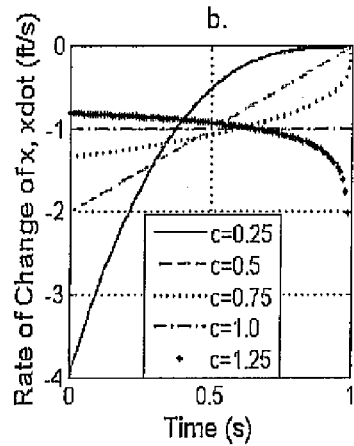
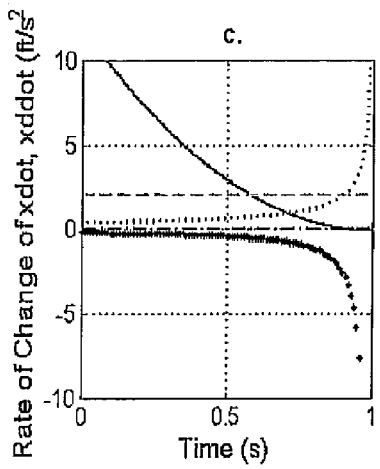
Fig. 1A  Fig. 1B  Fig. 1C
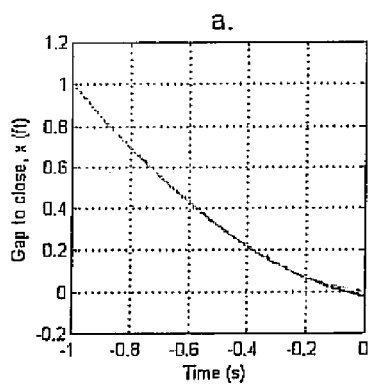
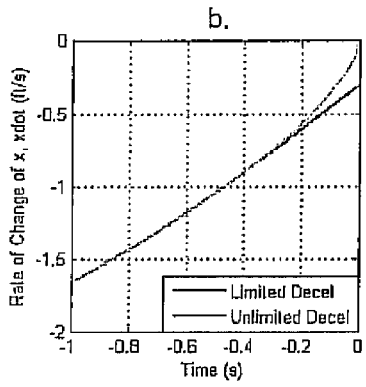
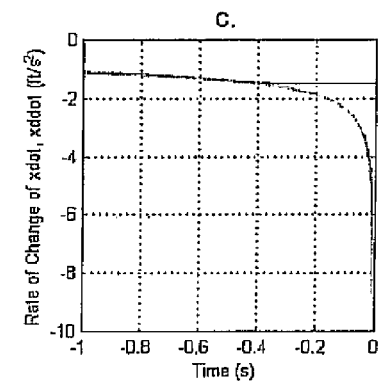
Fig. 2A  Fig. 2B  Fig. 2C

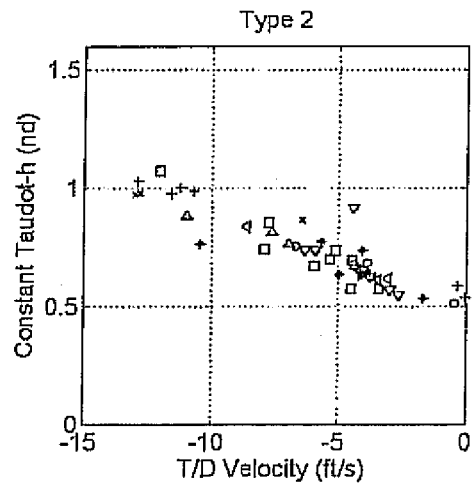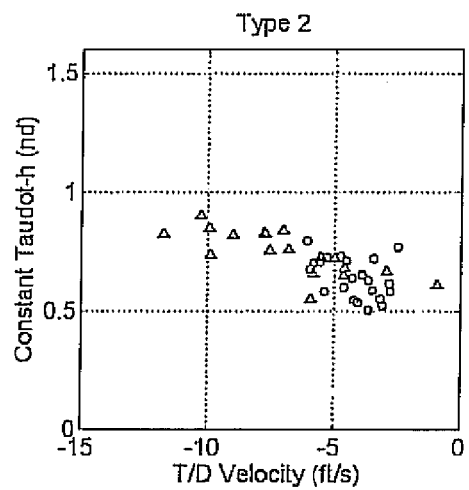
Fig. 8A  Fig. 8B
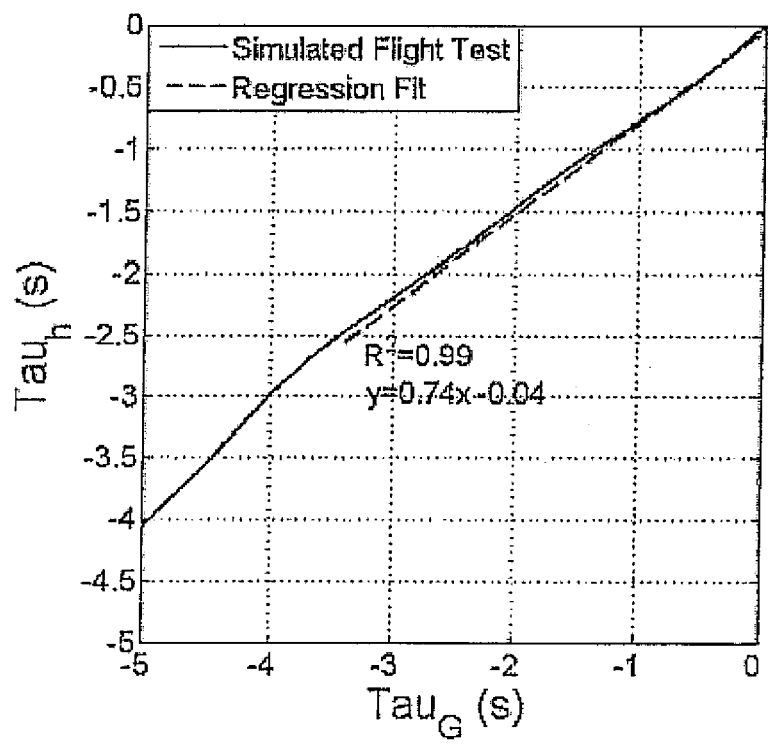
Fig. 9

VEHICLE GUIDANCE SYSTEM

The present invention relates to a vehicle guidance system. Particularly, but not exclusively, the present invention relates to a flight guidance system for aircraft.

A vehicle guidance system may be a system that is either directly arranged to guide a vehicle along a particular path (or trajectory) or is arranged to indirectly prompt a driver to guide a vehicle along a particular path. It will be appreciated that the basic principles and methodologies for a direct (or automatic) guidance system are substantially the same as those for an indirect (prompt or display based) system guidance system.

A vehicle guidance system may for example be used to aid the guidance of an aircraft during flight. The system may, for example, be an automatic system linked directly, or indirectly, to the flight controls and able to automatically fly (i.e. without the input of a human pilot) an aircraft along a flight path within defined accuracy tolerances. Alternatively or additionally, a vehicle guidance system may be used as a system that prompts a pilot to control an aircraft so as to follow a particular flight path.

Particularly when used in an aircraft, a primary requirement for a vehicle guidance system, regardless of whether it is an automatic or display type system, is to ensure that the flight of the aircraft is conducted safely. A key aspect of flight safety is to ensure that an aircraft remains on its intended flight path in order to ensure that the correct separation between any two aircraft is maintained.

Currently, aircraft are scheduled to fly along fixed routes called airways and are vectored along these routes and around airports by air traffic control. However, in order to meet increasing demand for air transport (which puts an increasing strain on already crowded airways) there is a demand for aircraft to be flown at reduced separations and/or in non-defined airways. In such an environment, there is a demand for improved guidance systems. Furthermore, it is incumbent upon providers of flight-deck equipment, such as guidance displays, to present information regarding both the aircraft status and that of the surrounding environment to an aircraft's flight crew that will allow a rapid and intuitive assessment to be made of the safety and appropriateness of the current situation (flight path selected, execution of that flight path etc.). Such a system must allow easy manual intervention or the monitoring of the automatic processes. With the introduction of new technology and high levels of automated systems, a pilot's workload may be largely concerned with systems monitoring. This has led to several concerns, for example:
1. whilst manual workload has decreased, mental workload has increased;
2. human beings do not perform at all well in monitoring task situations;
3. removal of the crew from the control loop of the aircraft reduces their ability to maintain an awareness of the aircraft's situation;
4. flight-deck technology has become so complex that it is difficult for flight crew to understand the principles on which the automation is operating; and
5. the extensive use of automation has reduced the proficiency of pilots to perform flight tasks manually.

Accordingly, flight deck technology such as guidance systems have seen many improvements to ensure that automatic control systems are more effective and pilots are provided with more readily available guidance information. However, the fundamental information presented to the pilot in existing aircraft displays and used to guide the aircraft in conventional flight control systems has remained largely unchanged. In order to provide more accurate and intuitive flight guidance systems it may be desirable to now consider alternative parameters on which to base guidance systems.

It is, therefore, an aim of embodiments of the present invention to obviate or mitigate at least some of the problems of the prior art, and to provide an improved vehicle guidance system.

According to a first aspect of the present invention there is provided a vehicle guidance system comprising:
a measurement system;
a processor arranged to receive information from the measurement system and convert said information into at least one time-to-contact based parameter; and
a control system arranged to receive the at least one time-to-contact based parameter from the processor and use the at least one time-to-contact based parameter to either automatically guide the vehicle or to provide vehicle guidance information to a pilot.

While the term "pilot" may most commonly be used to refer to the operator of a ship or aircraft, it will be appreciated that it in the present invention it is not intended to be limiting and is used in its broader meaning of any person that is guiding or directing the motion of any vehicle (which may for example include an automobile).

As will be explained in further detail below, it has been suggested that the "time-to-contact" or "Tau" ($\tau$) of a spatial gap is a natural mechanism used by all animals to guide themselves through their environment. The time-to-contact or Tau ($\tau$) of a motion gap may be defined as the time to close the gap at the current rate of closure. The use of time-to-contact ($\tau$) based parameters is based upon the premise that it is not spatial variables that are the primary source of information used by an observer under motion, but time-based variables. For example, when approaching a stationary object, it is not the distance to the object or the speed at which the object is approached that is used to control the motion by the observer's visual system, rather the time-to-contact that object. Thus, embodiments of the invention seek to improve vehicle guidance systems by incorporating the principles of natural perception mechanisms.

In some embodiments the control system may be arranged to compare the at least one time-to-contact ($\tau$) based parameter with a target time-to-contact ($\tau$) based parameter.

The control system may for example be an automatic control system, such as an automatic flight control system (for example the guidance system may be used in an "auto-pilot" for a conventional aircraft or may be used to control an unmanned aerial vehicle). Additionally or alternatively the control system may be a display system arranged to display information related to the time-to-contact ($\tau$) based parameter for instructing a pilot to guide the vehicle. The control system may for example comprise a display with display symbology driven by the time-to-contact ($\tau$) based parameter.

In embodiments in which the control system provides both an automatic vehicle control system and a display system it will be appreciated that the vehicle guidance system may be arranged to allow a user to select between automatic control and display systems. In embodiments in which the control system provides an automatic control system, a display system may be provided to enable a pilot to monitor the guidance system, and the pilot may for example be able to intervene in the guidance of the vehicle.

The display system may for example be a flight display system. There are several types of flight display system and the invention is not intended to be limited to any one form. For example, the flight display system could be a Head-Down Display, which may for example comprise a software-generated image displayed on a cathode ray tube or liquid crystal display. For example the display may be a Primary Flight Display or a Navigation Display. Alternatively the flight display system may comprise a Head-Up Display, in which a software-generated image may for example be displayed on generally transparent display element located in the aircraft pilot's line of sight, for example placed between the between the pilot and the cockpit windscreen.

In some embodiments the display system is arranged to indicate the variance between the time-to-contact ($\tau$) based parameter and a target time-to-contact ($\tau$) based parameter to guide the vehicle. In other words, the display may be arranged to directly display the target time-to-contact ($\tau$) based parameter. For example the display system could be arranged to display the current and target values of the rate of change of time-to-contact ($\dot{\tau}$). In embodiments in which the time-to-contact ($\tau$) based parameter is a coupled time-to-contact ($\tau$) parameter, the display system could for example be arranged to display the current and target values of the coupling constant (k).

The display system may indicate the variance between the time-to-contact ($\tau$) based parameter and a target time-to-contact ($\tau$) based parameter by indicating the predicted position of the vehicle, based on its current trajectory, at a particular future time instance and by indicating the target position of the vehicle at the same time future time instance. In such an embodiment the target time-to-contact ($\tau$) based parameter may not need to be directly displayed directly to the pilot. Instead of displaying direct information regarding the target time-to-contact ($\tau$) based parameter information may be displayed to the pilot that results in the same desired trajectory being accomplished. The flight display system may for example be arranged to calculate the target position of the vehicle so as to provide a constant rate of change of time-to-contact ($\tau$) motion. The target value for the rate of change of time-to-contact ($\dot{\tau}$) may for example be selected from the range of 0.5 to 1.0. The target value may for example be 0.6.

The flight display system may for example display a target position indicator symbol and a predicted position indicator symbol, each indicator symbol being scaled to represent the forward position of the vehicle at the time interval in the future. Scaling of the indicator symbols enables an essentially 2-dimensional display (i.e. having x and y screen coordinates) to represent the position of the indicator symbol in 3-dimensions. By varying the scaling of the indicators over time (as the target and predicted positions are varying with respect to time) it is possible to provide a pilot with an indication of whether the vehicle being guided is moving closer to or falling further behind an indicated position. Thus, the flight guidance system may also be used to ensure that the vehicle is maintaining the correct airspeed. This utilizes the optical perception phenomena of "looming" in which the rate of change of size of an object provides an indication of its relative velocity with respect to the viewing point.

To increase the realism of the looming effect the indicator symbols may be scaled such that, in at least one dimension, the size of the symbols corresponds to the actual size that the lead vehicle would be in the represented position at the particular future time instance, when viewed from the vehicle's current position. For example, where the vehicle is an aircraft the symbols may be matched to the wingspan of the aircraft that would be viewed. Matching the size of the symbol to the particular vehicle on which the guidance system is to be used may for example be used to further increase the realism of the display. In a flight display system the display may also indicate the roll angle of the indicated position symbols. The flight display system may for example be arranged to calculate the rotation of the displayed symbol by taking into account the rotational position of the aircraft at the time interval in the future and the current rotational position of the aircraft.

In order to ensure that all of the guidance information required by the pilot is provided in a single display, the flight display system in some embodiments may be arranged to display a horizon indicator line.

The time-to-contact ($\tau$) based parameter may for example simply be the instantaneous time-to-contact ($\tau$). "Instantaneous time-to-contact" ($\tau$) refers to the closure time of a gap at any single point in time (it will be appreciated that the time-to-contact ($\tau$) of a gap will vary with respect to time during a motion). However, in some embodiments the time-to-contact based parameter is a rate of change of the instantaneous time-to-contact ($\tau$) (i.e. the rate of change of time-to-contact ($\dot{\tau}$)). In embodiments in which the time-to-contact based parameter is a rate of change of time-to-contact ($\dot{\tau}$) the parameter may be compared to a constant target value of the rate of change of time-to-contact ($\dot{\tau}$). Therefore display system could for example be arranged to display the current and target values of the rate of change of time-to-contact. The target value for the rate of change of time-to-contact ($\dot{\tau}$) may for example be selected from the range of 0.5 to 1.0. The target value may for example be 0.6.

In some embodiments the processor may be arranged to couple the time-to-contact ($\tau$) of two separate motion gaps. The time-to-contact ($\tau$) of two separate gaps may be considered "coupled" if the time-to-contact ($\tau$) of the motion gaps are in a constant ratio over a period of time. The time-to-contact ($\tau$) of two separate gaps may for example be linked by a coupling constant (k). Accordingly, in some embodiments the control system may be arranged to compare the coupling constant with a target coupling constant.

It may not be necessary for two actual gaps to be provided to provide a coupled target time-to-contact ($\tau$) parameter. For example, one of the time-to-contact parameters to be coupled might be defined by a tau-guide. A tau guide ($\tau_g$) is generally defined in nature as a time-to-contact ($\tau$) value generated by the observer's central nervous system. This can be used to couple onto the time-to-contact ($\tau$) of an externally perceived motion gap when no convenient second external gap is available, A general intrinsic time-to-contact guide ($\tau_G$) is a theorized intrinsic target time-to-contact ($\tau$), which is a function of the total duration of a motion and the current time during of the motion.

($\dot{\tau}$). In embodiments in which the time-to-contact ($\tau$) based parameter is a coupled time-to-contact ($\tau$) parameter, the display system could for example be arranged to display the current and target values of the coupling constant (k).

The control system may be arranged to guide the vehicle, or provide information to instruct the pilot to guide the vehicle, to close a gap between a current or projected position of the vehicle and a target position in a motion having a constant rate of change of time-to-contact. The motion may for example have a rate of change of time-to-contact ($\dot{\tau}$) selected from the range of 0.5 to 1.0. The rate of change of time-to-contact ($\dot{\tau}$) may for example be 0.6.

The measurement system may for example comprise an optical measurement system arranged to capture information relating to the optic flow with respect to a vehicle. For example, the measurement symbol may be a camera and, for example, the processor may be arranged to measure the divergence of optic flow in images captured by the camera. For example the camera could be a downward looking camera for capturing spatial flow information from the runway during takeoff and/or landing of an aircraft.

In other embodiments the measurement system comprises spatial variable measurement instruments and the processor is arranged to convert the measured spatial variables into a time-to-contact ($\tau$) based parameter. For example, an aircraft will typically be provided with a plurality of spatial variable measurement instruments which may be suitable for use in the measurement system. For example, an aircraft may be provided with a localizer and/or a Global Positioning System (GPS) receiver that may be used to provide positional information. GPS may also be used to provide the aircraft inertial position. An aircraft may also be provided with onboard inertial systems, which may for example be used in the flight guidance system to provide aircraft attitude information. Vertical gap closure information may for example be provided using an onboard radar altimeter.

The vehicle guidance system may for example be an aircraft guidance system for use in an aircraft. For example the guidance system may be an aircraft landing guidance system arranged to guide the vehicle or provide information to instruct the pilot to guide the vehicle in a first motion having a rate of change of time-to-contact of 1 followed by a second motion having a rate of change of time-to-contact ($\dot{\tau}$) of between 0.6 and 0.8. For example, the first motion may be during the final approach of the aircraft and the second motion may, for example, be during the flare. The control system may for example comprise a display system on which a flight path vector symbol is generated.

According to a second aspect of the present invention there is provided a vehicle guidance method comprising:

measuring information relating to the optical flow with respect to a vehicle;

converting said information into a time-to-contact ($\tau$) based parameter; and using the time-to-contact ($\tau$) based parameter to either automatically guide the vehicle or to provide vehicle guidance information to the pilot.

The method may for example comprise using the time-to-contact ($\tau$) based parameter to guide the vehicle. Alternatively, the method may comprise displaying information related to the time-to-contact ($\tau$) based parameter for instructing a pilot to guide the vehicle. Alternatively or additionally, the method may comprise an automatic vehicle guidance system.

All of the features described herein (including any accompanying claims, abstract and drawings), and/or all of the steps of any method or process so disclosed, may be combined with any of the above aspects in any combination, except combinations where at least some of such features and/or steps are mutually exclusive. For example, embodiments of the apparatus in accordance with the first aspect of the invention may be arranged to operate in accordance with any or all of the embodiments of the method according to the second aspect of the invention.

For a better understanding of the invention, and to show how embodiments of the same may be carried into effect, reference will now be made, by way of example, to the accompanying diagrammatic figures in which:

FIG. 1 shows the theoretical normalized motion profile of an object undergoing motion governed by an equation: (a) distance travelled across gap (b) instantaneous velocity of object and (c) object acceleration;

FIG. 2 shows the theoretical normalized motion profile of an object undergoing motion governed by the equation, but with a nominal limit on the acceleration available: (a) distance travelled across gap (b) instantaneous velocity of object and (c) acceleration of object;

FIG. 8 shows analysis of touchdown velocity at culmination of Type 2 flares for (a) simulated flight test data and (b) flight test data;

FIG. 9 represents the correlation of simulated flare height Tau data and General Intrinsic Tau Guide;

Figure 19:
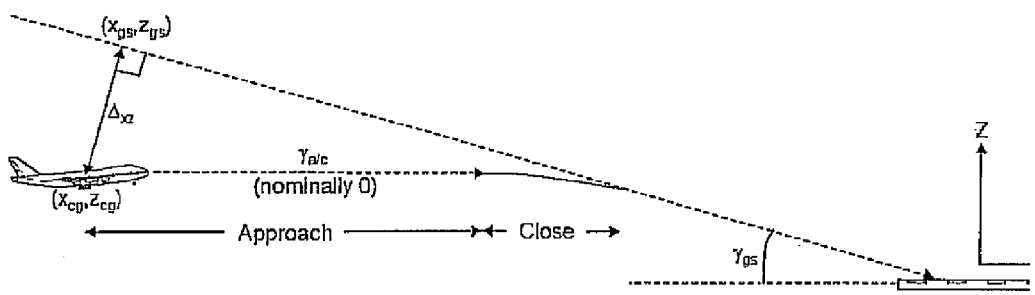
Figure 20:
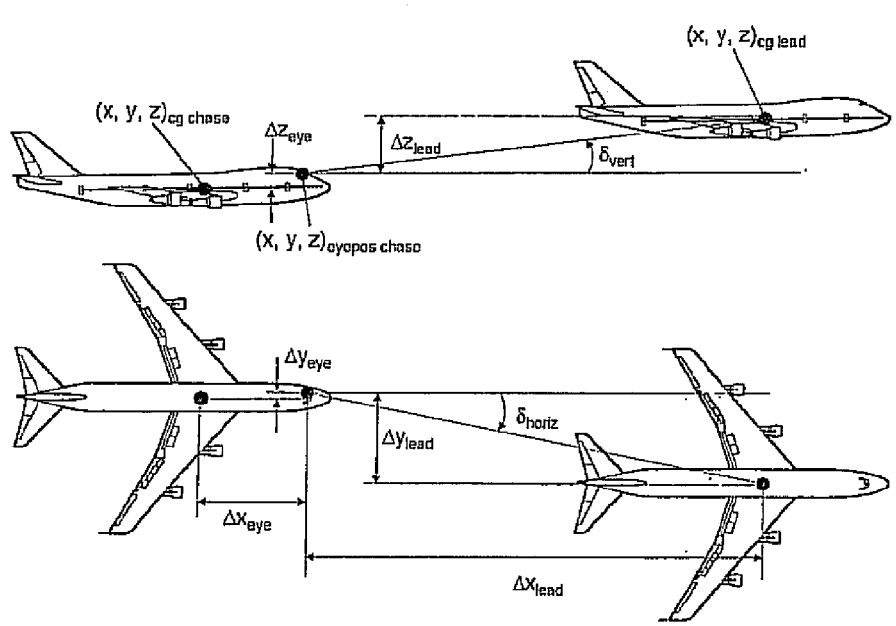
Figure 21:
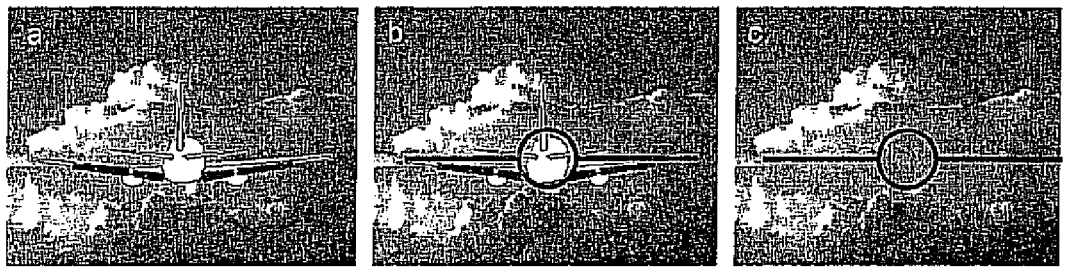
Figure 22:
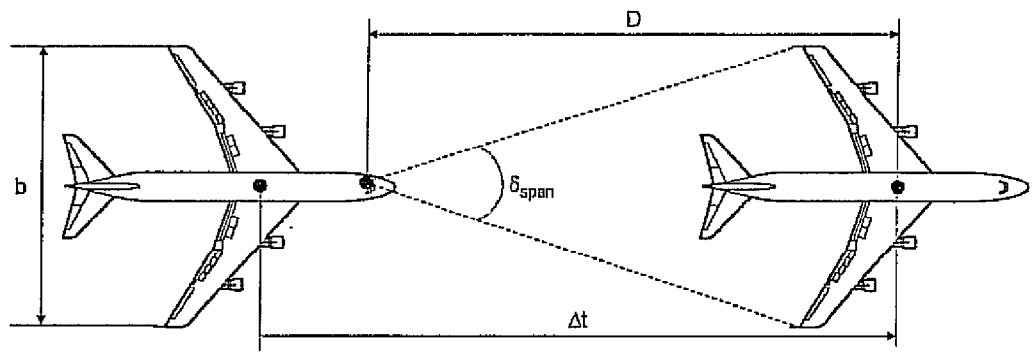
Figure 23:
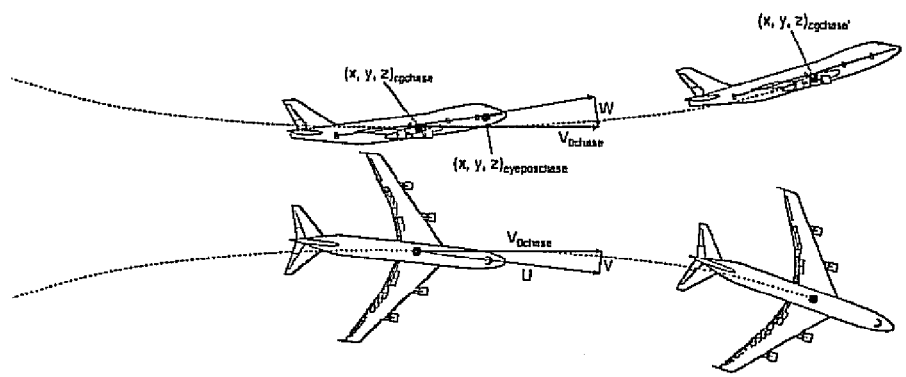

FIG. 19. shows the definition of glide slope capture trajectory parameters;

FIG. 20. shows the definition of variables used to compute screen position of lead aircraft symbol;

FIG. 21 Illustrates the concept for sizing the lead aircraft guidance symbol: (a) lead aircraft as it would appear; (b) lead aircraft symbol matched to real lead aircraft wing span visual angle and (c) lead aircraft symbol as it would appear to pilot;

FIG. 22 shows the definition of parameters used to compute scaling factor for lead aircraft symbol; and FIG. 23. shows the definition of parameters used to compute the screen position of the predictor aircraft symbol Experimental and theoretical research was carried out to investigate the use of target time-to-contact ($\tau$) based parameters in vehicle guidance systems, and particularly in flight guidance systems. For a better understanding of the invention the background principles and the experimental and theoretical basis used to develop the method and apparatus according to the invention are described in detail below. Exemplary embodiments of the invention will also be described. For the ease of reference a list of nomenclature used in this description is provided at the end of the description.

Ecological psychology provides a framework to explain how organisms, from the most simple to the most complex, using primarily (but not exclusively) vision, are able to guide themselves through whatever environment they inhabit using the optic flow generated by motion over the surface and through the clutter. Optic flow is defined as the way in which individual points in the visual field of an observer move from moment to moment as that observer undergoes motion. This simple concept provides multiple pieces of information to the observer, for example:

i) the position of potential obstacles via, for instance, motion parallax. This phenomenon is most evident when travelling in a fast-moving vehicle such as a car on a motorway or train. Objects close to the observer move by quickly whereas the motion of objects in the far distance is barely perceptible.

ii) whether an object is being approached or moved away from. The optical looming of an object provides this information.

iii) the point of impact of an approaching obstacle. This is the point from which the optic flow field apparently emanates.

A relatively recent development of optic flow presents the temporal variable Tau ($\tau$), defined as the instantaneous time to close on or contact a surface, as the more fundamental input to the natural perception system. This theory is based upon the premise that it is not spatial variables that are the primary source of information used by an observer under motion, but time-based variables. Thus, when approaching a stationary object, it is not the distance to the object or the speed at which the object is approached that is used to control the motion by the observer's visual system, rather the time-to-contact that object.

The time-to-contact an object (designated $\tau$) a distance 'x' away from an observer traveling at a closure rate of $\dot{x}$ is given by:

$$\tau_x = \frac{x}{\dot{x}} \tag{1}$$

A central tenet of Tau-theory is that motion of an observer is guided using information perceived by the observing organism's sensory systems through the closure of gaps. In flight, there are many motion gaps that need to be closed to guide an aircraft along the appropriate trajectory. Accordingly, the applicants believe that it may be advantageous to present information to a pilot based on the target time-to-contact ($\tau$) parameter in order assist in the design of intuitive displays.

Tau theory has generated a considerable amount of research effort in various fields over the years and a number of methods of its use proposed. The first of these is that motion gaps are controlled using a constant rate of change of $\tau$ strategy i.e.

$$\dot{\tau}_x = c \tag{2}$$

Figure 3:
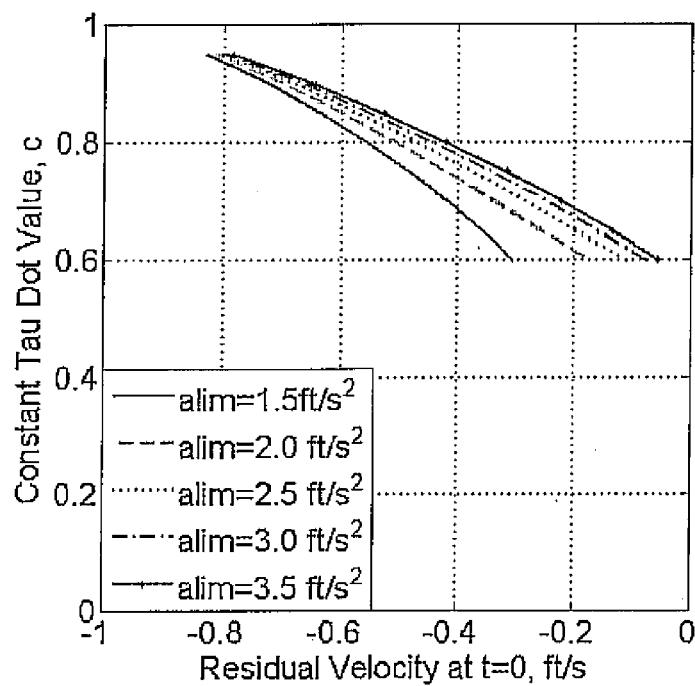
FIG. 3 shows the effect of magnitude of limiting acceleration on residual velocity when gap closure distance becomes zero.

FIG. 1 shows the theoretical normalized motion gap profiles that would be observed under the control strategy of Eq. 2. It can be observed from this figure that the gap is closed for all values of the constant 'c'. However, for values of 'c'<0.5, the gap is closed over less than the assigned time for the manoeuvre which actually means that the target object or surface is not reached. The first of two special cases exist at c=0.5 where the target is approached with a constant deceleration and is reached just as the observer velocity reaches zero. For values 0.5<c<1.0, decelerative approaches are still observed but the deceleration occurs at an increasingly late stage during the motion. In these cases however, the target is still reached with zero velocity. For motion where 'c'=1.0, the gap is closed at constant velocity and for c>1.0, accelerative approaches to the surface are observed. Inspection of FIG. 1(c) indicates that for the decelerative approach cases, increasing amounts of decelerative capability are required to close the target motion gap. In practice, this capability may not exist (due to control power limitations or due to intolerance of the observer to acceleration levels above a particular threshold, for example). FIG. 2 presents the equivalent plots to FIG. 1 for a constant rate of change of $\tau$ motion gap closure strategy with c=0.6, but compares the theoretical motion with one where a nominal limit is placed upon the decelerative capability of the observer in motion. It can be seen that the gap closure is not affected significantly, but now, instead of the target being reached with zero velocity, it is reached with some residual velocity. To assess the sensitivity of this analysis, FIG. 3 shows, for the normalized case, how the selection of the nominal limit on acceleration (alim) affects the residual velocity for a range of values of 'c'. This shows that whatever the limiting acceleration value, the residual velocity as the target is reached is a quasi-linear function of the value of 'c' used during the closure of the motion gap.

A more recent proposal in Tau Theory has been that observers control their motion by coupling externally perceived Tau information onto a so-called General Tau Guides ($\tau_g$ and $\tau_G$). The Tau guides are posited to be generated by the observer's central nervous system.

The earlier form of the guide, tg is given by:

$$\tau_g = \frac{1}{2}\left(t - \frac{T^2}{t}\right) 0 < t \leq T \tag{2a}$$

And the latest version by:

$$\tau_G = \frac{t(T+t)}{T+2t} - T \leq t \leq 0 \tag{2b}$$

It can be shown that Eq. 2a represents the latter half of the motion defined by Eq. (2b).

For such motion, the closure of a motion gap 'x' would be coupled as follows:

$$\tau_x = k\tau_g \text{ or } \tau_x = k\tau_G \tag{3}$$

where $\tau_x$ is the Tau of the spatial variable x, $\tau_g$ is the early version of the intrinsic tau guide, $\tau_G$ is the General Intrinsic Tau guide and k is the coupling constant. Both $\tau_x$, $\tau_g$ and $\tau_G$ vary with time.

Figures 4A, 4B, 4C:
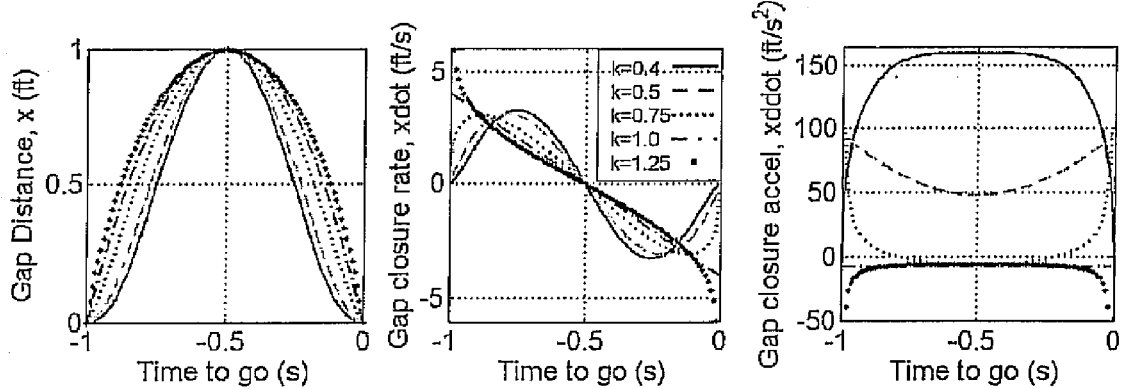
FIG. 4 shows the theoretical normalized motion profile of an object undergoing motion governed by an equation and the General Intrinsic Tau Guide of a different equation: (a) distance travelled across gap (b) instantaneous velocity of object and (c) acceleration of object.

FIG. 4 shows the normalized motion gap trajectories that an observer would undergo if coupled onto $\tau_G$. Unlike constant $\dot{\tau}$ motion strategies which were only proposed for motion towards a target, Tau guided motions support motion away from and towards a target. Again, the coupling constant, k, that is selected by the observer for the motion dictates the trajectory that is followed. If the closure phase of the motion is considered, for values of k<0.5, the target object or surface is not reached. For values of 0.5=<k<1.0, the target is just reached with zero velocity. However, as k is increased towards 1.0, the deceleration to arrest the motion is commenced at an increasingly late stage in the manoeuvre. When k=1.0, the motion is undertaken with constant deceleration and for values of k>1.0, the target is reached under accelerative motion.

Figure 5:
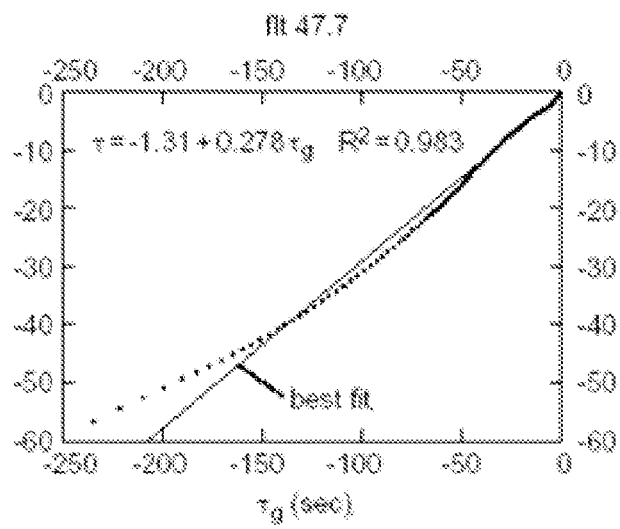
FIG. 5 shows the correlation of motion Tau and Tau guide for helicopter deceleration manoeuvre.

Using optic flow and its temporal representation, $\tau$, as a starting point the Applicants carried out a number of research projects to develop an improved understanding of what visual cues are used by pilots in flight and how these are used to guide the aircraft through the Earth's environment. The Applicants found that when a helicopter pilot executes a deceleration to hover, the translational motion to the hover appears to be guided by an intrinsic motion maintaining constant rate of change of $\tau$ ($\dot{\tau}$). Furthermore, it was found that a complete acceleration-deceleration manoeuvre could be modelled based on an intrinsic $\tau$-guide having a constant acceleration profile. This is shown in FIG. 5.

Figure 6A:
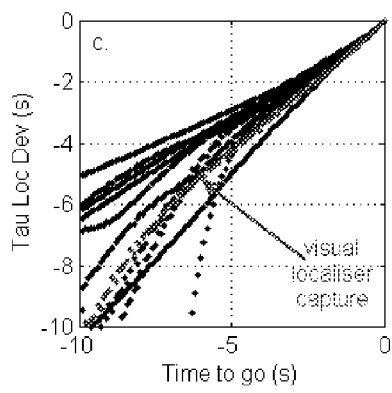
FIG. 6 shows an illustration of constant rate of change of Tau gap closures for (a) localizer capture (visual and instrument) and (b) glide slope capture (instrument only)
Figure 6B:
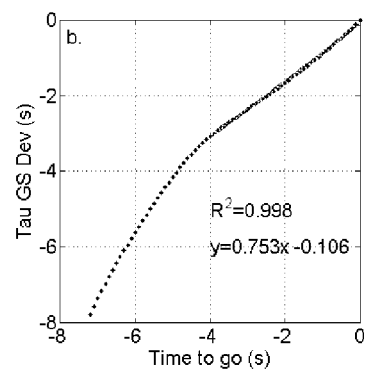
Figure 7A:
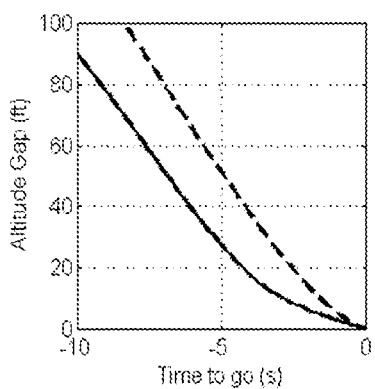
FIG. 7 shows two flare manoeuvre types in Tau domain.
Figure 7B:
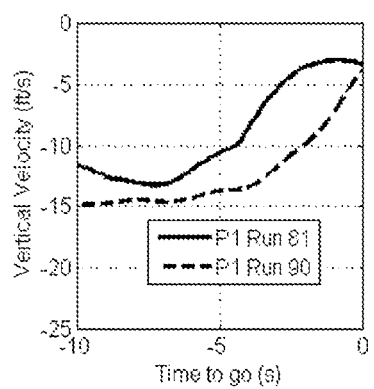
Figure 7C:
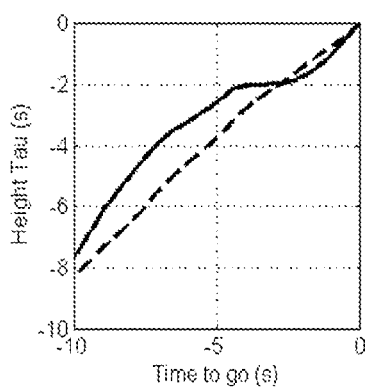

$\tau$ was further investigated using the University of Liverpool's flight simulator in the context of both rotary and fixed-wing flight with some unexpected but compelling results. In the first example as shown in FIG. 6, both localizer and glide slope capture manoeuvres are shown to be conducted using constant $\dot{\tau}$ motion gap closure strategies both visually and under instrument flight conditions. In a second example, analysis of the flare-to-land manoeuvre revealed that pilots use one of two strategies in the Tau domain, as shown in FIG. 7—a first flare that contains a period of constant $\tau$ (Type 1, Run 81) or a flare that exhibits continuous deceleration (Type 2, Run 90). These types of flare will be respectively referred to herein as a "Type 1 flare" and a "Type 2 flare".

In both cases, it can be seen that $\dot{\tau}_{\Delta h}$ is constant for the latter part the manoeuvre i.e. both flares conform to the hypothesis of Eq. 2. However, the Type 2 flare is considered to be the most representative example of this hypothesis and as such, FIG. 8(a) presents the equivalent analysis of FIG. 3 for the simulated flight test data. It is immediately apparent that the quasi-linear relationship predicted between the value of 'c' and the residual velocity at the target surface (in this case, the touchdown velocity at the runway) does indeed occur.

These results were so compelling that a further analysis was conducted on flight test data. The results are presented in FIG. 8(b). Again, the quasi-linear relationship is evident but perhaps more startling are the almost identical results obtained from a linear regression analysis of the two sets of data of FIGS. 8(a) and 8(b). The curves obtained have equations:

$$\dot{\tau}_h = -0.033 \dot{h}_{td} + 0.538$$

(simulated flight test, $R^2 = 0.83$)

$$\dot{\tau}_h = -0.031 \dot{h}_{td} + 0.5203$$

(flight test $R^2 = 0.51$)

In summary, the results of the research indicate that it is likely that strategies involving constant $\dot{\tau}$ gap closure relationships are routinely used by pilots when flying visually, with reference to the outside world. Thus, the applicants have recognized that Tau theory provides an exciting new opportunity in terms of the type of information that should be presented to pilots or indeed, in terms of the way that automated systems, (or vehicle guidance systems) can control an air (or other form of) vehicle (or object) under motion. For example, $\tau$-based motion relationships observed in the experimental results may be the information source for display symbology presented to pilots to allow them to guide their aircraft through the environment during manual phases of flight. This idea could also easily be extended to automated flight controls. It has also been shown for a Type 2 flare that the motion displays a strong correlation with the motion that would be undertaken if coupled to the General Intrinsic Tau Guide (FIG. 9).

In embodiments of the invention the pilot or automated flight control system (FCS) is no longer (exclusively) informed of or by spatial variables; at least some of the information received is Tau-based. When a particular gap is to be closed in flight, the pilot or FCS may be provided with information about the desired and actual Tau of that gap. The task for the pilot or FCS would then be to match the desired (or commanded) value with the actual value. In this way, a specified trajectory would be followed. In the examples discussed below, the desired 'Tau' value will be a constant rate-of-change-of-Tau ($\dot{\tau}$) value. However, as discussed, in other embodiments the trajectory may also be defined by coupling the commanded motion onto an Intrinsic Tau Guide.

Figure 10:
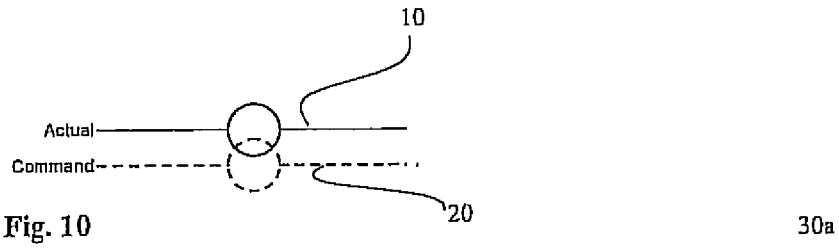
FIG. 10 represents a command and actual aircraft data symbol convention used in embodiments of the invention.

FIG. 10 shows the display in accordance with an embodiment of the invention. A first indicator symbol 10 is provided in solid lines for indicating the actual (current or future) position or target time-to-contact ($\tau$) parameter of the aircraft. A second indicator symbol 20 is provided in broken lines for indicating the target or "command" (current or future) position or target time-to-contact ($\tau$) parameter of the aircraft. It will be appreciated that the invention is not intended to be limited to the particular nature or format of the exemplary symbols used to display the information as discussed below, and that other formats will be apparent to the skilled reader which utilize the controlling algorithms behind the symbols. The exemplary symbol convention shown in FIG. 10 will, therefore, be used in the remainder of this document.

The embodiments of the invention discussed below generally relate to the implementation of the invention using a flight display system rather than a FCS. However, the skilled person in the art will appreciate that the same principles may also be applied to a flight control system.

The research and development conducted by the applicants had centered around the approach to land phase of flight, based in part upon an analysis of fatal aircraft accident data. Concentrating on this phase of flight enabled a number of, so called 'mission task elements' (MTEs) to be defined for fixed-wing transport operations. For the approach and land phase of flight, the following MTEs have been considered for analysis:
  i) Localizer Capture (line aircraft ground track up with runway centre-line).
  ii) Glide Slope Capture (establish aircraft on a descent to arrive over threshold of runway at approximately 50 ft above ground).
  iii) Flare (arrest descent rate to bring aircraft main gear into contact with the runway surface at an acceptable vertical speed).

As such, the remainder of the description will concentrate on the embodiments of the invention related to these three motion MTEs. However, the skilled person will appreciate that the invention is not limited to any particular phase of flight and that the methodology described herein may easily be applied to other aspects of a vehicle's motion to provide embodiments within the scope of the invention.

As discussed above, one of the principle tenets of Tau Theory is that organisms control their motion through the closure of gaps. Thus the applicants identified that one of the design drivers for the displays from the research was that it must therefore enable the pilot to close the required motion gap. The MTEs listed above can be thought of as the motion gaps to be closed. To achieve this, the pilot must be aware of both the target gap value and the current actual gap value in order that the closure can be modulated to completion. The first option for a display format therefore is to provide the pilot with the Tau information that he requires to close the motion gap in question directly. To explain what is meant by the term, 'directly', an example is required. The Type 2 flare will be used for this purpose. For the Type 2 flare, results have been shown that two Tau-domain relationships exist for the closure of the aircraft height to the runway surface ($\Delta h$). Formally therefore, $x = \Delta h$ in Eqs. 2 and 4 and so:

$$\dot{\tau}_{\Delta h} = c \quad (4)$$

$$\tau_{\Delta h} = k\tau_G \quad (5)$$

The term 'direct' simply means that a display would provide two pieces of information to the pilot:
1. The desired or commanded value of the constant values 'c' or 'k' and
2. The current actual value of the constant values of 'c' or 'k'.

Each of these values would be represented by a symbol and the pilot's task would therefore to be to overlay the 'actual' symbol with the 'desired' symbol to move the aircraft trajectory along the desired path.

The corollary to this argument is that indirect Tau information is information that is displayed to the pilot that results in the same desired trajectory being accomplished but using a means other than displaying the desired and actual values of 'c' and 'k' to the pilot. It still means, however, that whatever the source of the information provided to the pilot, a target value and an actual value must be presented. This, of course, is not a new idea in itself. Displays already in existence use this method to present information to the pilot. The FD provides target roll and pitch attitude to the pilot and, when flying manually, the pilot must match the aircraft roll and pitch information to the commanded motion to achieve the desired motion. The new idea in this instance is that the commanded motion be based upon the information that the pilot naturally uses from the visual field to perceive his self-motion and hence the motion of the aircraft.

The underlying concepts of direct and indirect presentation of the Tau information are generically applicable to all gap closures that follow Tau-based motions. However, a number of specific embodiments have been tested by the applicants and these will be used to illustrate the point. For clarity purposes a number of basic display issues are excluded from the following description of the embodiments. However these display issues will be discussed separately below for completeness (and to help demonstrate the general applicability of the methodology).

Indirect Display Embodiment 1—Lead/Predictor Symbology

Figure 11:
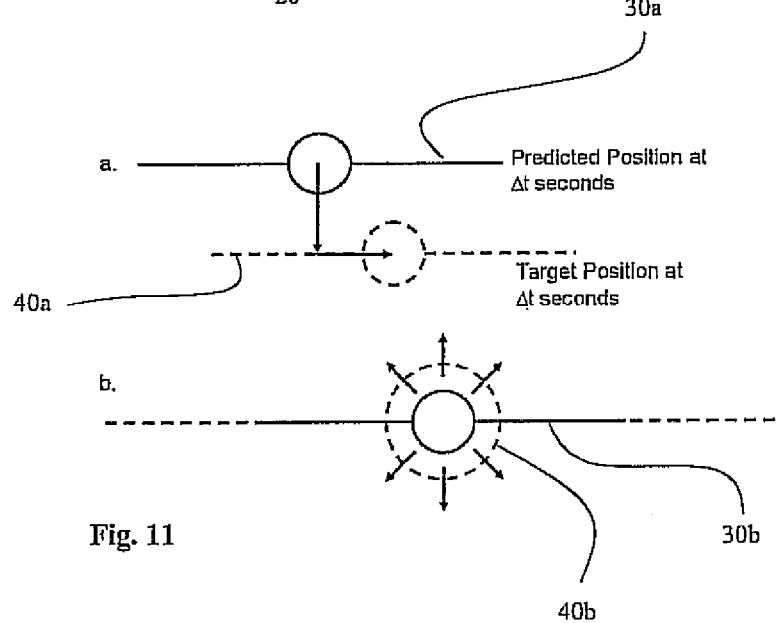
FIG. 11 shows the predictor-lead symbol concept showing (a) current predicted position high and left of target and (b) chase aircraft speed high compared to target (this is visible due to looming of lead aircraft symbol) in accordance with embodiments of the invention.

As shown in FIG. 11, a first embodiment of an indirect guidance system provides a target and predicted indicator symbols. The principle behind this idea is that the command symbol provides the desired future aircraft position in $\Delta t$ seconds. In essence, this symbol represents a 'lead' or 'follow-me' aircraft that the pilot must follow in the 'chase' aircraft along the required trajectory. The 'actual' symbol provides the predicted position of the chase aircraft (i.e. the aircraft under guidance) in $\Delta t$ seconds.

The particular embodiments of the invention tested by the applicants utilized the following concepts:
1. Whenever a gap is to be closed in the planned trajectory (e.g. localizer or glide slope capture) uses a constant $\dot{\tau}$ motion profile. Experimental results indicate that $\dot{\tau}_{\Delta y}=c1$ is a suitable mechanism to close localizer gap and $\dot{\tau}_{\Delta xz}=c2$ the glide slope capture gap. Suggested values for these parameters (based upon experimental results) are c1=c2=0.6. This feature will be discussed in further detail below.
2. Provide the symbology with a third degree of freedom (the first two being x and y screen coordinates) that allows the lead aircraft to 'loom'. The pilot's task is then to overlay the aircraft motion prediction symbol with the lead aircraft symbol and also match the size of the two symbols. In this way, the pilot will also maintain the correct airspeed along the desired trajectory. This idea is shown in FIG. 11.

In the exemplary display shown in FIG. 11, a first symbol 30 is provided indicating the predicted position of the vehicle, based on its current trajectory, at a particular future time instance (ie at a time of $\Delta t$) and a second symbol 40 is provided for indicating the target (which may also be referred to as a command or ideal) position of the vehicle at the same time future time instance. In FIG. 11a it can intuitively be seen that the predicted position indicator 30a is high and to the left of the target position indicator 40a. In FIG. 11b it can intuitively be seen that the predicted position indicator 30b aligned with but ahead of the target position indicator 40b (due to the looming of the target indicator).

In order to make the looming as realistic as possible the applicants arranged the displays such that the wingspan viewing angle corresponds to the viewing angle of an actual lead aircraft of the type being flown as the chase aircraft. The algorithms used calculate the positions and scales of the aircraft symbols are discussed in further detail below.

To supplement aircraft attitude information, a horizon line was incorporated into the display of this embodiment. In this way, all guidance information required by the pilot is incorporated into three display symbols.

Direct Display Embodiment—Flare Symbology

Figure 12:
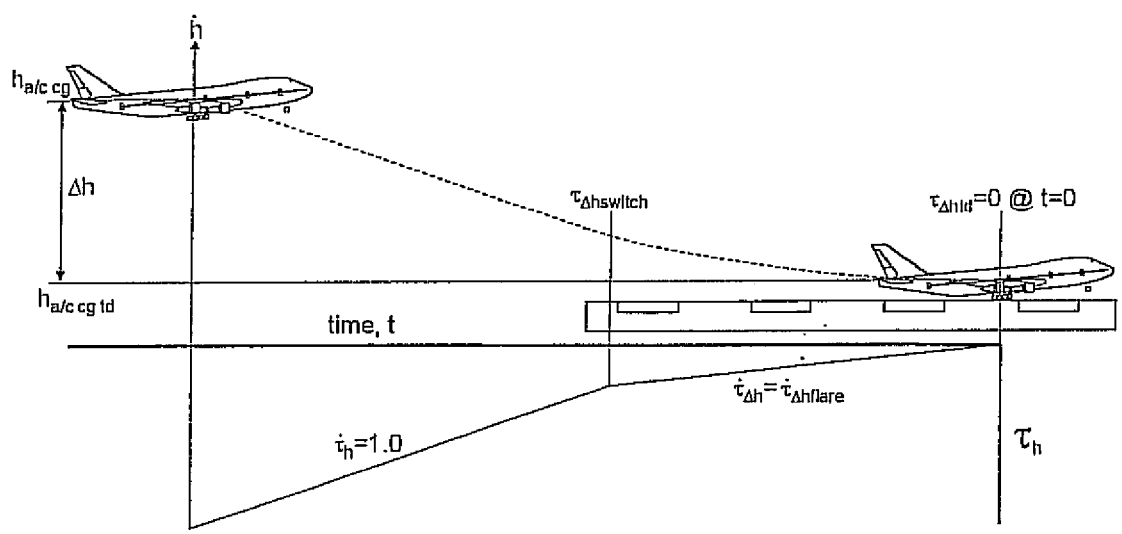
FIG. 12 shows the definition of parameters used to calculate the control algorithm for the direct Tau flare symbol concept.
Figure 13:
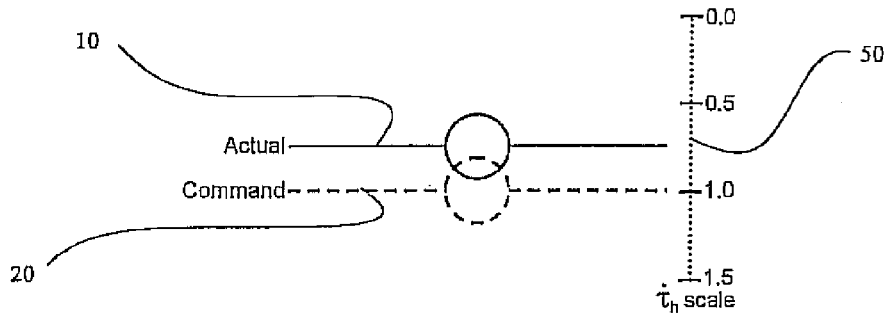
FIG. 13 shows the definition of direct Tau flare guidance display.

Another embodiment of uses a direct display arrangement to provide flare symbology. The idealized Type 2 flare, based upon experimental results, in the $\tau_{\Delta h}$ domain is shown in FIG. 12 For the final approach, a constant descent rate is required and so $\tau_{\Delta hcommand}=1.0$. At the flare transition point, when $\tau_{\Delta h}=\tau_{hswitch}$, set $\tau_{\Delta hcommand}=\tau_{hflare}$, where, from experimental results, $\tau_{\Delta hflare}$ will be in the region 0.6-0.8. The direct symbology approach would simply provide the command and actual $\tau_h$ the values in the form of a scale. This concept is shown in FIG. 13 (notionally in the approach configuration). It should be noted that the scale 50 itself would not be shown on the display. This is included in the figure to illustrate the correct orientation of the scale such that the command symbol 20 moves in the logical sense for a pitch up manoeuvre. The scale range is a suggested to avoid the display symbols hitting 'hard stops' during the flare manoeuvre. In this case, the positioning of the symbols on the screen is relatively arbitrary and only needs to be within the pilot's visual field.

Indirect Display Embodiment 2—Flare Flight Path Vector Symbology

A second embodiment of an indirect guidance system provides a flare flight path vector symbology. A common method of presenting trajectory information in aircraft head-up displays is via a flight-path vector symbol (FPV). This is a symbol that is conformal with the outside world (that is, visual angles are preserved). This means that the FPV shows the pilot the actual aircraft direction of travel with respect to the forward view available through the aircraft wind screen and HUD combiner. The inventive idea for this example display is to provide the pilot with command and actual flight path information that will result in a Tau-based trajectory being flown. For a Type 2 flare, represented by Eq. 5, the commanded flight path for such a flare is given by:

$$\gamma_{vc} = \theta - \frac{1}{\cos\theta\cos\phi}\left[\frac{1}{U}\sqrt{\frac{\Delta h \dot{h}}{1-c}} + \sin\theta\right] \quad (6)$$

and the actual flight path by:

$$\gamma_{vchase} = \theta - \alpha \quad (7)$$

During the Applicants work, a value of c=0.75 was found to be suitable. For completeness a full derivation of Eq. 7 is given below.

The preceding sections have described how Tau-based variables can be used to provide guidance to a pilot manually flying an aircraft. What has been implied but ignored to this point is how those parameters can be measured by the aircraft systems to provide the information to the display algorithms. In an ideal scenario, the aircraft would be equipped with an appropriate Tau sensor that could measure the Tau of the various gaps directly and hence its rate of change. The control algorithms could then operate on this information. Methods of the extracting the Tau of motion gaps from a flow measured using an optic flow sensor have been proposed which measure the divergence of the optic flow. Thus, for example a camera looking downwards at the runway surface could be provided for use in the flare MTE. However, this sensor might well be compromised in severely degraded visual conditions. Use would have to be made, therefore, of other means of measuring the Taus of the motion gaps. Accordingly, the most practical means of obtaining Tau for the displays described above is via the measurement of spatial variables. The first obvious candidate for the localizer and glide slope capture phases of the approach is to use signals from the satellite-based Global Positioning System (GPS). Typical horizontal accuracy figures for GPS receivers are 3.0 m when used autonomously or 1.0 m when used with reference to a base station. Vertical accuracy is likely to degrade by a factor of two. Such accuracy is more than satisfactory for the approach phases of the flight. By using GPS, the aircraft inertial position is known, Onboard Inertial Navigation Systems (or INS) will provide aircraft attitude information and from this, the calculations detailed in this document can proceed.

For the flare MTE, the gap information is most likely to be sourced from the onboard radar altimeter that transport aircraft are fitted with. Typical accuracy values for these devices are of the order of a few feet but some claims are made for improvements that will give the order of 0.5 ft accuracy. This level of accuracy would certainly be sufficient to provide height above the runway data for use in computing the aircraft height-Tau and hence its rate of change.

Classically there are three tasks that a pilot must carry out during flight: navigation, guidance and stabilization. The navigation task deals with the pilot knowing the current and next desired position of the aircraft with respect to the Earth's surface, with timescales measured in minutes and distances measured in miles. Stabilization of the aircraft, at the other extreme, involves the continuous correction of small, localized errors in the desired flight path or aircraft attitude induced by, for example, atmospheric disturbances. Much of this task is automated for large transport and some civil helicopter operations, but will still be required, for example, during a manual approach and landing in gusty conditions. The stabilization task involves timescales of the order of a second and rotations of a few degrees. The guidance task falls between the stabilization task and navigation task in terms of both the timescales and spatial measures with which the pilot is concerned. It deals with, for example, the avoidance of obstacles when close to or on the ground and involves timescales of several seconds and distances of several hundreds of feet. While the present invention is primarily concerned with the guidance function it will be appreciated that any of the above aspects may include the closure of a gap (which, therefore, may have a time-to-contact ($\tau$) approach applied thereto). Thus, embodiments of the invention may be concerned with any of the three pilot tasks.

Further details of the implementation of the embodiments discussed above will now be provided. It will be appreciated that these details are merely intended to assist the skilled person in implementing the methodology of the invention and are not intended to limit the invention in any way.

Figure 14:
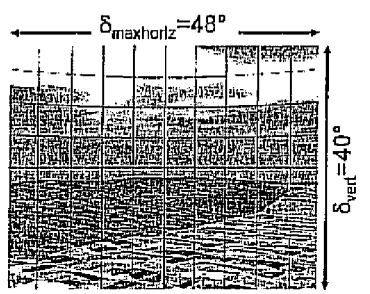
FIG. 14 shows the five degree viewing angle grid for out-the-window-centre visual display used in embodiments of the invention.

Some of the display design principles relating to the above embodiments of the invention will now be described in further detail, by way of example only. Before commencing the detailed description of the symbol control algorithms, it is first necessary to understand the general principles on which such a display is based. The displays to be used were to be 'head-up' and, where appropriate, the symbols conformal with the outside world. Conformal symbology means that viewing angles are preserved so the symbol appears on a display where it would appear in the visual field if the pilot were simply looking through the aircraft windscreen. The first issue to understand, therefore, is that the view of the outside world corresponds to a set of horizontal and vertical viewing angles. FIG. 14 shows an example of the forward view, as seen by the pilot in a good visual environment divided into a grid of 5-degree vertical and horizontal lines.

The second issue to comprehend is that these viewing angles must be mapped onto the coordinate system being used to generate the display symbology. For the purposes of this document, the HUD 'screen' is considered to be the full dimensions of the simulation facility's centre channel monitor.

Figure 15:
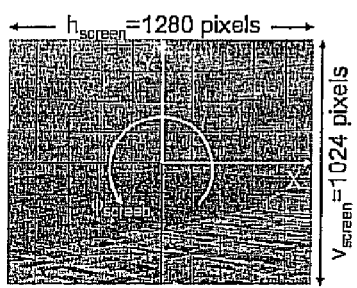
FIG. 15 shows the display coordinate system used in embodiments of the invention.

The symbol coordinate system and screen dimensions used are shown overlaid on the viewing angles in FIG. 15. Of course, for a real HUD combiner, the dimensions would be different but the principles remain the same.

Figure 16:
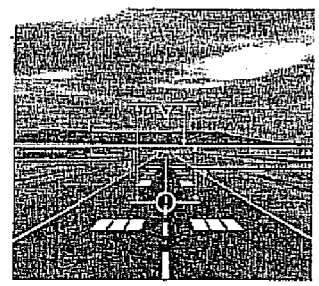
FIG. 16 shows the key aircraft display angles used in embodiments of the invention.

In order to position display symbols conformally, a basic understanding of how aircraft angles in flight correspond to features in the outside world visual scene, The vertical plane angles are shown in FIG. 16. From top to bottom, the 'gull-wing' symbol is the aircraft bore-sight and can be thought of as the direction in which the aircraft nose is pointing. The horizontal line represents the horizon and the aircraft symbol provides flight path vector information i.e. the direction in which the aircraft is actually moving. The aircraft pitch angle ($\theta$), incidence angle ($\alpha$) and flight path angle ($\gamma$) are marked in relation to these symbols.

Finally, it must be recognized that a correction should be made to the display coordinates to account for aircraft roll, Any calculated display x-y coordinates must be converted to the coordinate system x'-y' that accounts for aircraft roll using the following transformation:

$$x' = x \cos(-\phi) + y \sin(-\phi) \quad (A1)$$

$$y' = -x \sin(-\phi) + y \cos(-\phi) \quad (A2)$$

The principles behind the positioning and scaling of the Lead Aircraft Position symbology used in the exemplary embodiment described above will now be described in further detail. The specific idea for this symbol set was to provide translational guidance information to the pilot of the chase aircraft via the relative positions of the lead and predictor aircraft symbols on the screen. Changes in chase aircraft translational location would be driven by constant $\tau$ trajectory gap closures. Timing guidance would be provided via the chase aircraft symbol looming when compared to the lead aircraft as it would if there were a real aircraft ahead. Finally, general attitude guidance would be provided by an artificial straight-line horizon. By implication, these symbols would need to be conformal with the outside world.

The lead aircraft symbol required four pieces of information:
1. x-coordinate position on display screen;
2. y-coordinate position on display screen;
3. roll angle of lead aircraft and 4. scale at which to display.

Figure 17:
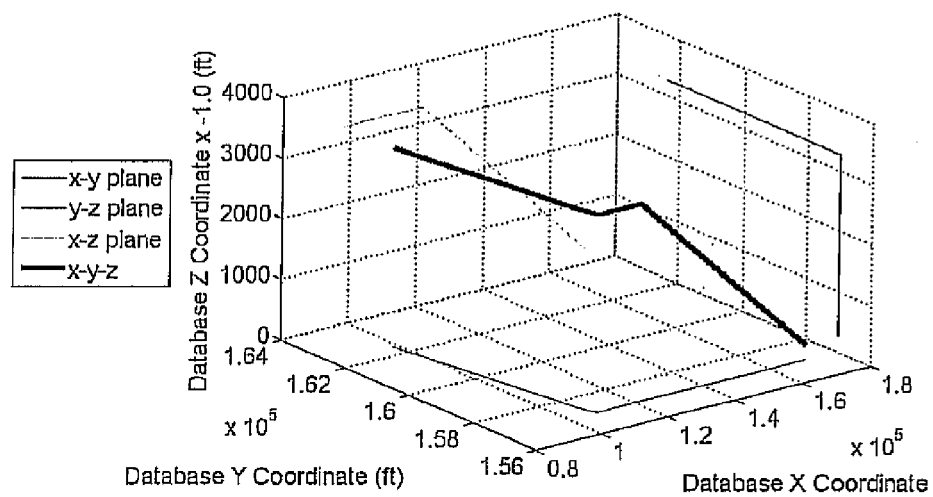
FIG. 17 shows an example full approach profile in inertial coordinates.
Figure 18:
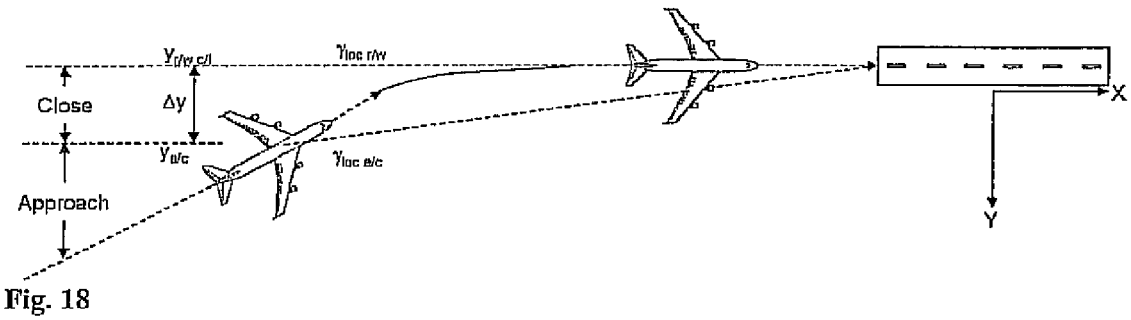
FIG. 18 shows the definition of localizer capture trajectory parameters.

The start point for the calculation of the x- and y-screen coordinates was to define the trajectory to be followed in terms of inertial x, y, z coordinates and aircraft roll angle, $\phi$. FIG. 17 shows a nominal 3-D approach trajectory in an inertial x,y,z coordinate system. The equivalent 2-D plots of the data are also shown in the figure to try to illustrate more fully the motion being undertaken (N.B.1—the axis scales are not equal so the trajectory proportions are distorted with respect to reality; N.B.2—the actual coordinates in FIG. 17 pertain to the simulation database used by the applicants. In reality, the coordinate system used would most likely be Earth-referenced). Each portion of the approach profile needs to be calculated to be at a specific true airspeed. The localizer capture phase of the trajectory is calculated as a motion gap closed using a constant $\dot{\tau}$ strategy. Specifically, the trajectory closure phase tested by the applicants, illustrated in FIG. 18 is given by:

$$\dot{\tau}_{\Delta y} = c1 \tag{B1}$$

where the eventual value of the constant 'c1' settled upon as a design parameter was 0.6.

The glide slope capture phase of the trajectory was also calculated as a motion gap closed using a constant $\dot{\tau}$ strategy. Specifically, the trajectory closure phase tested by the applicants is illustrated in FIG. 19 is given by:

$$\dot{\tau}_{\Delta xz} = c2 \tag{B2}$$

where the eventual value of the constant 'c2' settled upon as a design parameter was 0.6.

These trajectory data may, in reality, need be loaded into the aircraft FMS. At any time therefore, the positions of the centre-of-gravity of both the lead and the chase aircraft will be known or can be calculated. The calculation to ascertain the screen position of the lead aircraft can then proceed as follows, with reference to FIG. 20:

1. Calculate pilot eye position in inertial coordinates. The offset values for the pilot eye position from the modelled aircraft centre of gravity (($\Delta x, \Delta y, \Delta Z)_{eye}$) are known in aircraft body coordinates:

$$\begin{bmatrix} x_{eyeposchase} \\ y_{eyeposchase} \\ z_{eyeposchase} \end{bmatrix}_{body} = \begin{bmatrix} x_{cgchase} \\ y_{cgchase} \\ z_{cgchase} \end{bmatrix}_{body} + \begin{bmatrix} \Delta x \\ \Delta y \\ \Delta z \end{bmatrix}_{eye} \tag{B3}$$

2. The pilot eye position coordinates of the chase aircraft can now be converted into inertial coordinates through the usual transformation:

$$\begin{bmatrix} x_{eyeposchase} \\ y_{eyeposchase} \\ z_{eyeposchase} \end{bmatrix}_{inertial} = [D]^{-1} \begin{bmatrix} x_{eyeposchase} \\ y_{eyeposchase} \\ z_{eyeposchase} \end{bmatrix}_{body} \tag{B4}$$

Where $[D]^{-1}$ is defined for an aircraft at an Euler pitch angle $\theta$, Euler roll angle, $\phi$ and Euler yaw angle, $\psi$ as [34]:

$$[D]^{-1} = \begin{bmatrix} \cos\Psi\cos\theta & \cos\Psi\sin\theta\sin\phi - \sin\Psi\cos\phi & \cos\Psi\sin\theta\cos\phi + \sin\Psi\sin\phi \\ \sin\Psi\cos\theta & \sin\Psi\sin\theta\sin\phi + \cos\Psi\cos\phi & \sin\Psi\sin\theta\cos\phi - \cos\Psi\sin\phi \\ -\sin\theta & \cos\theta\sin\phi & \cos\theta\cos\phi \end{bmatrix} \tag{B5}$$

3. Calculate the x, y and z offsets of the command lead aircraft e.g. from the chase aircraft pilot eye position.

$$\begin{bmatrix} \Delta x_{lead} \\ \Delta y_{lead} \\ \Delta z_{lead} \end{bmatrix} = \begin{bmatrix} x_{cglead} \\ y_{cglead} \\ z_{cglead} \end{bmatrix}_{inertial} - \begin{bmatrix} x_{eyeposchase} \\ y_{eyeposchase} \\ z_{eyeposchase} \end{bmatrix}_{inertial} \tag{B6}$$

4. Calculate the horizontal and vertical visual angles of the lead aircraft e.g. from the chase aircraft pilot eye position.

$$\delta_{horiz} = \operatorname{atan}\left(\frac{\Delta y_{lead}}{\Delta x_{lead}}\right) \tag{B7}$$

$$\delta_{vert} = \operatorname{atan}\left(\frac{\Delta z_{lead}}{\Delta x_{lead}}\right) \tag{B8}$$

5. Calculate the screen x and y coordinates for the symbol. If the screen has a horizontal resolution of $h_{screen}$ pixels and a horizontal viewing angle of $\delta_{maxhoriz}$ degrees, then the horizontal position of the chase aircraft symbol, $h_{chase}$, where the symbol origin is at the middle-centre of the screen is computed as:

$$h_{lead} = \delta_{horiz} \times \frac{h_{screen}}{\delta_{max\ horiz}} \tag{B9}$$

Similarly, if the screen has a vertical resolution of $v_{screen}$ pixels and a vertical viewing angle of $\delta_{maxvert}$ degrees, then the vertical position of the chase aircraft symbol, $v_{chase}$ is given by:

$$v_{lead} = \delta_{vert} \times \frac{v_{screen}}{\delta_{max\ vert}} \tag{B10}$$

6. Compensate the screen x and y coordinates for any chase aircraft roll angle using Eqs. A1 and A2 with $x=h_{lend}$ and $y=_{lend}$.

The display concept of the embodiment also enabled the lead aircraft symbol to provide some indication of roll angle during any turn manoeuvres. The symbol cannot simply be rolled through the required angle because account must also be taken of the chase aircraft roll angle from which the lead aircraft is being 'viewed'. Consequently, the lead aircraft symbol roll angle is given by:

$$\phi_{lend} = \phi_{leaddmd} - \phi_{chase} \tag{B11}$$

The scale of the symbol was driven by the idea that the symbol should be as simple and yet as realistic as possible. To provide as realistic an impression as possible of the lead aircraft with only a 2-D aircraft symbol, it is considered necessary to provide an image that appears to be, in at least one dimension, the actual size that the lead aircraft would be at time Δt ahead of the chase aircraft. The dimension chosen to be matched in this embodiment was wing span. The lead aircraft symbol would have a wing span that provided a corresponding visual angle subtended at the observer as a real lead aircraft would. This concept is illustrated in FIG. 21.

The calculation used to perform the scaling of the lead aircraft was performed as follows, with reference to FIG. 22:

1. Compute the visual angle of the lead aircraft wingspan.

$$\delta_{span} \cong a\tan\left(\frac{b}{2D}\right) \quad (B12)$$

where b, the lead aircraft wing span is known and taken as the wing span of the aircraft being flown.

2. Compute the screen scaling factor, $\sigma_{lead}$, to apply to the lead aircraft graphical symbol. This is achieved by knowing that when the scale factor is 1.0, the symbol wing tips touch the screen edges, which provides a horizontal viewing angle of 48 degrees.

$$\sigma_{lead} = \delta_{span} \times \frac{v_{screen}}{\delta_{max\ horiz}} \quad (B13)$$

The predictor aircraft symbol required the same 4 pieces of information as the lead aircraft symbol:

1. x-coordinate position on display screen;
2. y-coordinate position on display screen;
3. roll angle of lead aircraft and
4. scale at which to display.

However, the method by which these values are obtained differs from that defined in Eqs. B3-B13 for the lead aircraft symbol. In order to proceed with the computation, a prediction time, Δt, was to be defined to establish how far ahead the prediction aircraft should be placed. Of course, this 'look ahead' time then has to be matched to the lead aircraft start position at the commencement of the trajectory guidance. Once Δt is defined, the calculation for the translational of the aircraft can proceed for the general case shown in FIG. 23 was as follows:

1. Compute the horizontal and vertical translational offsets through which the aircraft will travel assuming constant acceleration over the next Δt seconds.

$$\begin{bmatrix} \Delta x_{cgpred} \\ \Delta y_{cgpred} \\ \Delta z_{cgpred} \end{bmatrix}_{body} = \begin{bmatrix} u \\ v \\ w \end{bmatrix} \Delta t + \frac{1}{2}\begin{bmatrix} \dot{u} \\ \dot{v} \\ \dot{w} \end{bmatrix}(\Delta t)^2 \quad (B14)$$

2. Convert these offsets into inertial coordinates.

$$\begin{bmatrix} \Delta x_{cgpred} \\ \Delta y_{cgpred} \\ \Delta z_{cgpred} \end{bmatrix}_{intertial} = [D]^{-1}\begin{bmatrix} \Delta x_{cgpred} \\ \Delta y_{cgpred} \\ \Delta z_{cgpred} \end{bmatrix}_{body} \quad (B15)$$

Where $[D]^{-1}$ is defined in Eq. B5.

3. Compute the predicted aircraft centre of gravity inertial position based upon current inertial position plus prediction of translational offsets, $$\begin{bmatrix} x_{cgchase}' \\ y_{cgchase}' \\ z_{cgchase}' \end{bmatrix}_{inertial} = \begin{bmatrix} x_{cgchase} \\ y_{cgchase} \\ z_{cgchase} \end{bmatrix}_{inertial} + \begin{bmatrix} \Delta x_{cgpred} \\ \Delta y_{cgpred} \\ \Delta z_{cgpred} \end{bmatrix} \quad (B16)$$

4. The computation can now proceed as for the lead aircraft from Eq. B6 (the pilot eye position having already been calculated in Eq. B4) substituting $[X]_{cgchase}$ for $[X]_{cglead}$.

The chase aircraft would be indicating roll angle to the pilot and so the predictor aircraft would also be required to indicate roll angle. A similar scheme to the translational prediction routines was implemented. This simply estimated the increment in roll angle that would be achieved at current roll rate and acceleration:

$$\Delta \phi_{pred} = \dot{\phi}\Delta t + \frac{1}{2}\ddot{\phi}(\Delta t)^2 \quad (B17)$$

The scale of the predictor aircraft symbol is calculated in the same manner as for the lead aircraft symbol. However, in Eq. B12, the distance ahead used to calculate the scale parameter is not calculated from a pre-computed track but is obtained using:

$$D_{pred} = V_0 \Delta t \quad (B18)$$

The methodology for providing a command flight path vector symbol will now be discussed in further detail. In essence, the command symbol for the indirect display format was displaying the same information to the pilot as the direct display format. As such, the illustration of FIG. 12 is also applicable to the computation of the indirect Tau command and symbol logic. This computation proceeded as follows (for this embodiment, only the vertical plane is considered):

1. For the approach phase, set a command flight path angle equal to the runway glide slope, $\gamma_{gs}$ (=3.5 degrees for UoL).

$$V_{yc} = -\gamma_{gs}\frac{V_{screen}}{\delta_{vert}} \quad (C1)$$

2. Compute current instantaneous time-to-contact runway surface as per Eq. 5.

3. At $\tau_h = t_{transition}$ seconds, blend to the flight path angle $\dot{\tau}_h$ flare control law over $t_{blend}$ seconds, as derived in Appendix D which gives the required command flight path angle as:

$$\gamma_{vc} = \theta - \frac{1}{\cos\theta\cos\phi}\left[\frac{1}{U}\sqrt{\frac{\Delta h \dot{h}}{1-c}} + \sin\theta\right] \quad (C2)$$

Experimental results showed that for the aircraft simulation model used, $t_{transition}$ of 3.5 seconds was adequate, $t_{blend}$ of 0.5 seconds was used but this was arbitrary and more work needs to be done to optimize this value.

4. Compute symbol vertical (y) screen coordinate as:

$$V_{\gamma c} = -\gamma_{vc} \frac{V_{screen}}{\delta_{vert}} \quad (C3)$$

The actual flight path angle symbol position can be calculated as follows:
1. Compute chase aircraft vertical flight path angle:

$$\gamma_{vchase} = \theta - \alpha \quad (C4)$$

2. Compute symbol vertical (y) screen coordinate as:

$$V_{\gamma chase} = -\gamma_{vchase} \frac{V_{screen}}{\delta_{vert}} \quad (C5)$$

A detailed derivation of the expression used in the exemplary embodiment to drive the indirect Tau flare command display will now be given. This format of display commands the flight-path angle required to guide the aircraft along a trajectory consistent with a constant $\dot{\tau}_h$ motion gap closure. The first step, perhaps perversely, given the origins of the theory, is to express Tau in its spatial terms:

$$\tau_{\Delta h} = \frac{\Delta h}{\dot{h}} \quad (D1)$$

If the gap $\Delta h$ is closed with a constant rate of change of $\tau$ then:

$$\frac{d}{dt}\left[\frac{\Delta h}{\dot{h}}\right] = c \quad (D2)$$

which can be written:

$$\frac{\Delta h \ddot{h} - \dot{h}^2}{\dot{h}^2} = c \quad (D3)$$

This can be re-arranged as:

$$\dot{h} = \sqrt{\left(\frac{\Delta h \ddot{h}}{1-c}\right)} \quad (D4)$$

Perturbations in vertical flight path angle, $\gamma_v$, may be expressed in terms of perturbations in pitch attitude, $\theta$, and incidence angle, $\alpha$[34].

$$\gamma_v = \theta - \alpha \cong \theta - \frac{W}{U} \quad (D5)$$

Rearranging Eq. U2 for w yields:

$$W = U(\theta - \gamma_v) \quad (D6)$$

Now, $\dot{h}$ is the vertical velocity of the aircraft e.g. referenced to Earth or inertial axes. If lateral motion is ignored (an aircraft on final approach should be sufficiently stabilized in its ground track such that this assumption holds. Extreme cross-wind landing situations will invalidate this assumption), it can be shown that the perturbation in aircraft height is [34]:

$$\dot{h} = U\sin\theta - W\cos\theta\cos\phi \quad (D7)$$

Substituting Eq. D6 into Eq. D7 for W and equating with Eq. D4 and rearranging for $\gamma_v$ gives:

$$\gamma_v = \theta - \frac{1}{\cos\theta\cos\phi}\left[\frac{1}{U}\sqrt{\frac{\Delta h \ddot{h}}{1-c}} + \sin\theta\right] \quad (D8)$$

Notation
α—aircraft angle of incidence
d—wing span of lead aircraft
cn—value of constant rate of change of tau (n=1, 2, 3 . . . )
cg—centre-of-gravity
D—distance between chase aircraft pilot eye position and lead aircraft cg position
φ—aircraft Euler roll angle
γ—aircraft flight path angle
k—coupling constant between motion tau and General Intrinsic Tau Guide
Δh—height-gap, distance between aircraft cg during approach and aircraft cg at touchdown
θ—aircraft Euler pitch angle
t—instantaneous time during manoeuvre
T—total manoeuvre duration
Δt—look-ahead time for lead aircraft and chase aircraft predicted position
τ—time-to-contact a target surface or object
$\tau_G$—General Intrinsic Tau Guide
U—aircraft body axis longitudinal velocity
V—aircraft body axis lateral velocity
$V_0$—aircraft total velocity
W—aircraft body axis vertical velocity
x—display symbol calculated horizontal screen coordinate or motion gap to be closed
x'—display symbol calculated horizontal screen coordinate corrected for aircraft roll
Δxz—vertical motion gap between aircraft eg position and the normal to the extended target glide slope
y—display symbol calculated vertical screen coordinate
y'—display symbol calculated vertical screen coordinate corrected for aircraft roll
Δy—lateral motion gap between aircraft eg 'y' or 'East' position and target runway centre-line 'y' or 'East' position
Subscripts
a/c—aircraft
c—command
chase—chase aircraft (i.e. vehicle being piloted)
lead—lead or 'follow me' aircraft (i.e. fictional aircraft flown ahead of chase aircraft to guide the chase aircraft along a specified trajectory)
td—touchdown
v—vertical
Dressings $$\dot{x} = \frac{dx}{dt}$$

—differentiation with respect to time
Abbreviations
ATC—Air Traffic Control
ATM—Air Traffic Management
CRT—Cathode Ray Tube FCS—Flight Control System
FD—Flight Director
FPV—Flight Path Vector
GPS—Global Positioning System
HDD—Head-Down Display
HUD—Head-Up Display
IMU—Inertial Measurement Unit
LCD—Liquid Crystal Display
MTE—Mission Task Element
ND—Navigation Display
PFD—Primary Flight Display
RBS—Research Business Services
RNAV—Required area NAVigation
USA—United States of America

The invention claimed is:

1. A vehicle guidance system comprising:
a measurement system;
a processor arranged to receive information from the measurement system and convert said information into at least one time-to-contact based parameter; and
a control system arranged to receive the at least one time-to-contact based parameter from the processor, compare the at least one time-to-contact based parameter with at least one target time-to-contact based parameter, and use the at least one time-to-contact based parameter and the at least one target time-to-contact based parameter to automatically guide the vehicle to close a motion gap.

2. The system of claim 1, wherein the control system comprises a display system arranged to display information related to the at least one time-to-contact based parameter to the pilot.

3. The system of claim 1, wherein the control system is arranged to use the at least one time-to-contact based parameter to drive software-generated display symbology on a display system.

4. The system of claim 2, wherein the display system is arranged to directly display the variance between the at least one time-to-contact based parameter and the target time-to-contact based parameter.

5. The system of claim 2, wherein the display system indicates the variance between the at least one time-to-contact based parameter and the target time-to-contact based parameter by indicating the predicted position of the vehicle, based on its current trajectory, at a moment in time in the future and by indicating the target position of the vehicle at the same moment in time in the future.

6. The system of claim 5, wherein the display system displays a target position indicator symbol and a predicted position indicator symbol, each indicator symbol being scaled to represent the forward position of the vehicle at the moment in time in the future.

7. The system of claim 6, wherein the indicator symbols are scaled such that, in at least one dimension, the size of the symbols corresponds to the actual size that a vehicle would be if it were positioned at the future position represented by the symbol, when viewed from the guided vehicle's current position.

8. The system of claim 1, wherein the at least one time-to-contact based parameter comprises a rate of change of time-to-contact.

9. The system of claim 1, wherein processor is arranged to couple the time-to-contact of two separate motion gaps.

10. The system of claim 9, wherein the time-to-contact of two separate gaps are linked by a coupling constant and the control system is arranged to compare the coupling constant with a target coupling constant.

11. The system of claim 9, wherein one of the time-to-contact parameters to be coupled comprises a time-to-contact guide value.

12. The system of claim 11, wherein the processor provides the general intrinsic time-to-contact guide value using the equation $$\tau_G = \frac{t(T+t)}{T+2t}.$$

13. The system of claim 11, wherein the processor provides the constant acceleration time-to-contact guide value using the equation $$\tau_g = \frac{1}{2}\left(t - \frac{T^2}{t}\right).$$

14. The system of claim 1,
wherein the control system is arranged to guide the vehicle to close a gap between a current or projected position of the vehicle and a target position in a motion having a constant rate of change of time-to-contact.

15. The vehicle guidance system of claim 14, wherein the control system is arranged to guide the vehicle in a motion having a constant rate of change of time-to-contact between 0.6 and 0.8.

16. The vehicle guidance system of claim 14, wherein the control system is arranged to guide the vehicle in a motion having a constant rate of change of time-to-contact of approximately 0.6.

17. The system of claim 1, wherein the measurement system comprises a measurement system arranged to capture information relating to the optic flow with respect to a vehicle.

18. The system of claim 1, wherein the measurement system comprises at least one spatial variable measurement instrument and the processor is arranged to convert the measured spatial variables into a time-to-contact based parameter.

19. The system of claim 1, wherein the vehicle is an aircraft and the system is an aircraft guidance system.

20. An aircraft landing guidance system comprising:
a measurement system;
a processor arranged to receive information from the measurement system and convert said information into at least one time-to-contact based parameter; and
a control system arranged to receive the at least one time-to-contact based parameter from the processor, compare the at least one time-to-contact based parameter with target time-to-contact based parameter, and use the at least one time-to-contact based parameter to automatically guide an aircraft in a first motion having a rate of change of time-to-contact of 1 followed by a second motion having a rate of change of time-to-contact ($\dot{\tau}$) of between 0.6 and 0.8.

21. The system of claim 20, wherein the first motion is during the final approach of the aircraft and the second motion is during the flare.

22. The system of claim 20, wherein the control system comprises a display system on which a flight path vector symbol is generated.

23. The system of claim 22, wherein the flight path vector symbol indicates a target flight path of $$\gamma_{vc} = \theta - \frac{1}{\cos\theta\cos\phi}\left[\frac{1}{U}\sqrt{\frac{\Delta h \dot{h}}{1-c}} + \sin\theta\right]$$

24. A vehicle guidance method comprising:
measuring information;
converting said information into a time-to-contact based parameter;
comparing the time-to-contact based parameter and a target time-to-contact based parameter; and
using the time-to-contact based parameter and the target time-to-contact based parameter to automatically guide the vehicle to close a motion gap.

25. The vehicle guidance system according to claim 1, wherein the target time-to-contact based parameter is a time-to-contact which is linked by a coupling constant to a guide time-to-contact.

26. The vehicle guidance system according to claim 25, wherein the guide time-to-contact provides constant acceleration, deceleration or provides constant velocity during the closure of the motion gap.

27. A vehicle guidance system comprising:
a measurement system;
a processor arranged to receive information from the measurement system and convert said information into at least one time-to-contact based parameter; and
a control system arranged to receive the at least one time-to-contact based parameter from the processor, compare the at least one time-to contact based parameter with at least one target time-to-contact based parameter, and use the at least one time-to-contact based parameter and the at least one target time-to-contact based parameter to provide vehicle guidance information to a pilot to enable the pilot to close a motion gap, wherein the at least one time-to-contact based parameter comprises a rate of change of time-to-contact.

28. The system of claim 27, wherein the control system comprises a display system arranged to display information related to the at least one time-to-contact based parameter to the pilot.

29. The system of claim 27, wherein the control system is arranged to use the at least one time-to-contact based parameter to drive software-generated display symbology on a display system.

30. The system of claim 29, wherein the display system is arranged to directly display the variance between the at least one time-to-contact based parameter and the target time-to-contact based parameter.

31. The system of claim 29, wherein the display system indicates the variance between the at least one time-to-contact based parameter and the target time-to-contact based parameter by indicating the predicted position of the vehicle, based on its current trajectory, at a moment in time in the future and by indicating the target position of the vehicle at the same moment in time in the future.

32. The system of claim 31, wherein the display system displays a target position indicator symbol and a predicted position indicator symbol, each indicator symbol being scaled to represent the forward position of the vehicle at the moment in time in the future.

33. The system of claim 32, wherein the indicator symbols are scaled such that, in at least one dimension, the size of the symbols corresponds to the actual size that a vehicle would be if it were positioned at the future position represented by the symbol, when viewed from the guided vehicle's current position.

\* \* \* \* \*